(12) United States Patent
Hwang et al.

(10) Patent No.: US 11,984,803 B2
(45) Date of Patent: May 14, 2024

(54) CHARGE PUMP CIRCUIT AND OPERATING METHOD THEREOF

(71) Applicant: SAMSUNG ELECTRO-MECHANICS CO., LTD., Suwon-si (KR)

(72) Inventors: Wonsun Hwang, Suwon-si (KR); Byeonghak Jo, Suwon-si (KR); Shinhaeng Heo, Suwon-si (KR); Dongil Kang, Suwon-si (KR); Hyunjin Yoo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/077,319

(22) Filed: Dec. 8, 2022

(65) Prior Publication Data

US 2023/0412072 A1 Dec. 21, 2023

(30) Foreign Application Priority Data

Jun. 21, 2022 (KR) .......................... 10-2022-0075759

(51) Int. Cl.
*H02M 3/07* (2006.01)
(52) U.S. Cl.
CPC .................................... *H02M 3/07* (2013.01)
(58) Field of Classification Search
CPC ...................................................... H02M 3/07
See application file for complete search history.

(56) References Cited

U.S. PATENT DOCUMENTS

| | | | |
|---|---|---|---|
| 8,487,690 B2 | 7/2013 | Wei et al. | |
| 2008/0150619 A1 | 6/2008 | Lesso et al. | |
| 2008/0150620 A1* | 6/2008 | Lesso | H02M 3/07 327/536 |
| 2010/0085786 A1* | 4/2010 | Chiu | H02M 3/07 363/59 |
| 2011/0012671 A1* | 1/2011 | Chuang | H02M 3/07 327/536 |
| 2013/0177175 A1* | 7/2013 | Ting | H03G 1/0094 327/536 |
| 2016/0241142 A1 | 8/2016 | Scheel | |
| 2017/0279349 A1* | 9/2017 | Nork | H02M 3/07 |

FOREIGN PATENT DOCUMENTS

| | | |
|---|---|---|
| EP | 2 975 750 B1 | 8/2020 |
| KR | 10-1769677 B1 | 8/2017 |

* cited by examiner

*Primary Examiner* — Sibin Chen
(74) *Attorney, Agent, or Firm* — NSIP Law

(57) ABSTRACT

A charge pump circuit is provided. The charge pump circuit includes a first switch configured to have a first end connected to an input terminal that receives a power voltage; a second switch configured to have a first end connected to the input terminal; a first capacitor configured to have a first end connected to a second end of the first switch; a second capacitor connected between a second end of the first capacitor and a second end of the second switch; a third switch connected between the second end of the second switch and ground; a fourth switch connected between the first end of the first capacitor and a first output terminal and configured to output a first output voltage; and a fifth switch connected between a second output terminal and a node between the first capacitor and the second capacitor, and configured to output a second output voltage.

15 Claims, 7 Drawing Sheets

CHARGE PUMP CIRCUIT AND OPERATING METHOD THEREOF

CROSS-REFERENCE TO RELATED APPLICATION

This application claims the benefit under 35 USC § 119(a) of Korean Patent Application No. 10-2022-0075759, filed on Jun. 21, 2022, in the Korean Intellectual Property Office, the entire disclosure of which is incorporated herein by reference for all purposes.

BACKGROUND

1. Field

The following description relates to a charge pump circuit and an operating method thereof.

2. Description of Related Art

A radio frequency (RF) switch may be implemented in a transmitting end and a receiving end of a communication module or device, and it may transmit or block RF signals. The RF switch may select frequency bands. The RF switch circuit is being developed at a rapid pace in view of miniaturization and high-performance trends.

The RF switch receives a power voltage from an external device, and the power voltage may have to be changed to an appropriate voltage level in order to drive the RF switch. For example, in the example of a silicon on insulator (SOI) process that is an RF switch IC process, a voltage level of 2.5 V may be desired, and the power voltage supplied from an external source may be 1.8 V. In this example, a circuit to change the power voltage (e.g., 1.8 V) supplied from the external source at an appropriate voltage level (e.g., 2.5 V) may be implemented, and typically, a charge pump circuit may be implemented. That is, the power voltage that may be supplied to the RF switch has a limitation, and it is different from the power voltage that may achieve maximum performance in a field effect transistor (FET) process. To compensate for the difference, the charge pump circuit uses the power voltage supplied from the external source, and generates the voltage level that is appropriate to drive the RF switch.

The above information disclosed in this Background section is only for enhancement of understanding of the background, and therefore it may contain information that does not form the prior art that is already known in this country to a person of ordinary skill in the art.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a charge pump circuit includes a first switch configured to have a first end connected to an input terminal configured to receive a power voltage input; a second switch configured to have a first end connected to the input terminal; a first capacitor configured to have a first end connected to a second end of the first switch; a second capacitor connected between a second end of the first capacitor and a second end of the second switch; a third switch connected between the second end of the second switch and a ground; a fourth switch connected between the first end of the first capacitor and a first output terminal, and configured to output a first output voltage; and a fifth switch connected between a second output terminal and a node between the first capacitor and the second capacitor, and configured to output a second output voltage.

The charge pump circuit may further include a first resistor coupled in parallel with respective ends of the first capacitor; and a second resistor coupled in parallel with respective ends of the second capacitor.

For a first operation period, the first switch and the third switch may be turned on, and the second switch, the fourth switch, and the fifth switch are turned off, and for a second operation period, the second switch, the fourth switch, and the fifth switch may be turned on, and the first switch and the third switch are turned off.

A value of the first output voltage may be twice a value of the power voltage, and a value of the second output voltage may be less than the value of the first output voltage.

The second resistor may be a variable resistor.

The charge pump circuit may include a first load capacitor connected between the first output terminal and the ground; and a second load capacitor connected between the second output terminal and the ground.

The first output voltage may be applied to a body terminal of a radio frequency (RF) switch, and the second output voltage is applied to a gate terminal of the RF switch.

In a general aspect, a method includes coupling a first capacitor and a second capacitor in series with each other; charging the first capacitor and the second capacitor by turning on a first switch connected between a power voltage and a first end of the first capacitor, and turning on a third switch connected between a first end of the second capacitor and a ground; boosting the first capacitor and the second capacitor by turning on a second switch connected between the power voltage and the first end of the second capacitor; outputting a first output voltage by turning on a fourth switch connected between the first end of the first capacitor and a first output terminal; and outputting a second output voltage by turning on a fifth switch connected between a second output terminal and a node between the first capacitor and the second capacitor.

In the boosting, the first switch and the third switch may be turned off.

A first resistor may be coupled in parallel with respective ends of the first capacitor, and a second resistor may be coupled in parallel with respective ends of the second capacitor.

A value of the first output voltage may be twice a value of the power voltage, and a value of the second output voltage is less than a value of the first output voltage.

The first output voltage may be applied to a body terminal of a radio frequency (RF) switch, and the second output voltage may be applied to a gate terminal of the RF switch.

In a general aspect, a circuit includes a first switch connected to an input power voltage; a second switch connected to the input power voltage; a first capacitor and a second capacitor connected in series between the first switch and the second switch; a third switch connected to the second switch; a fourth switch connected to a first output terminal configured to output a first output voltage; and a fifth switch connected between a second output terminal configured to output a second output voltage and a terminal between the first capacitor and the second capacitor.

The circuit may include a first resistor connected in parallel with the first capacitor, and a second resistor connected in parallel with the second capacitor.

The circuit may include a first load capacitor connected between the fourth switch and the first output terminal, and a second load capacitor connected between the fifth switch and the second output terminal.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Throughout the specification, the RF signal may have a format according to other random wireless and wired protocols designated by, as only examples, Wi-Fi (IEEE 802.11 family, etc.), WiMAX (IEEE 802.16 family, etc.), IEEE 802.20, long term evolution (LTRE), Evolution-Data Optimized (Ev-DO), high-speed packet access plus (HSPA+), high-speed downlink packet access (HSDPA), high-speed downlink packet access plus ((HSDPA+), high-speed uplink packet access plus (HSUPA+), Enhanced Data GSM Evolution (EDGE), Global System for Mobile communication (GSM), Global Positioning System (GPS), General Packet Radio Service (GPRS), Code Division Multiple Access (CDMA), Time Division Multiple Access (TDMA), digital enhanced cordless communication (DECT), Bluetooth, third generation (3G), fourth generation (4G), fifth generation (5G), and other arbitrary wireless and wired protocols designated later, but is not limited thereto.

Figure 1:
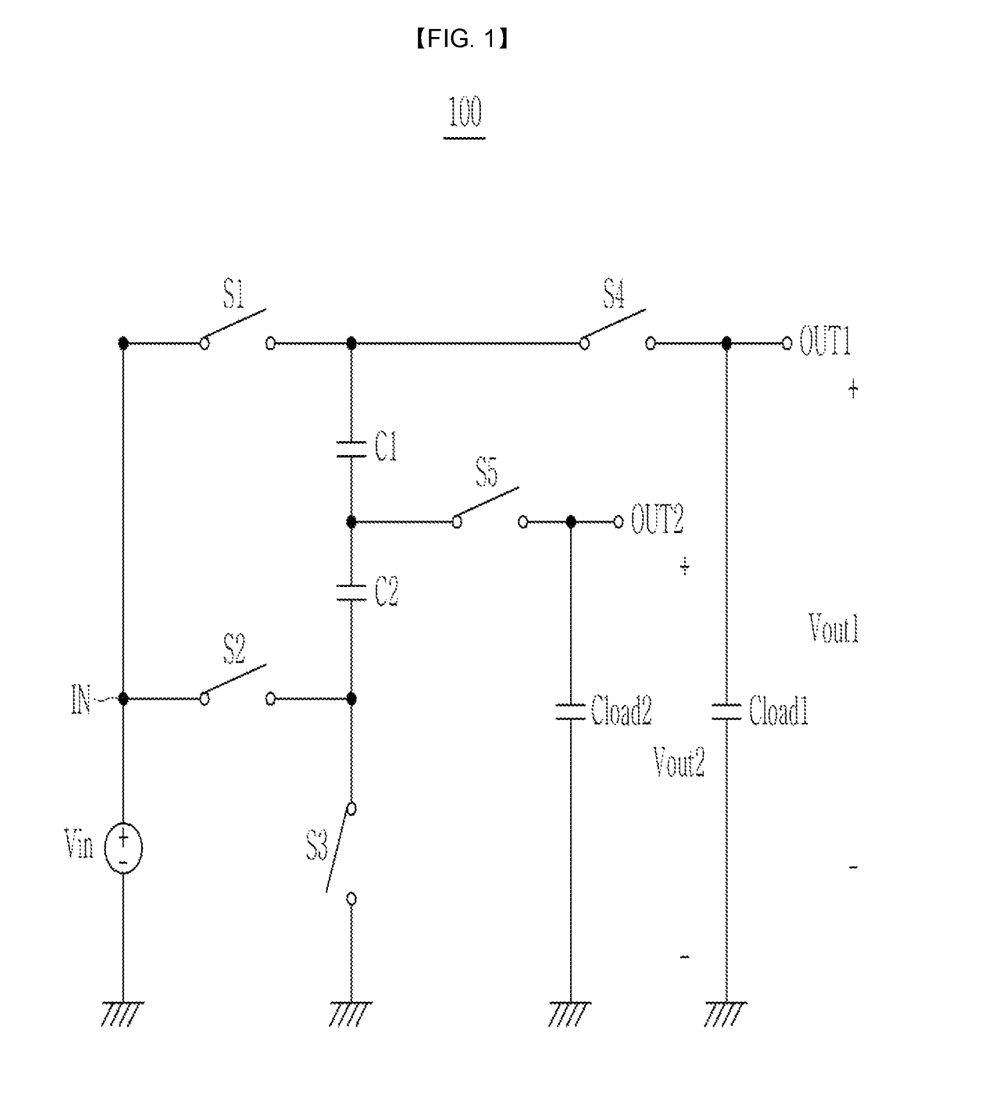
FIG. 1 illustrates an example charge pump circuit 100, in accordance with one or more embodiments.

FIG. 1 illustrates an example charge pump circuit 100, in accordance with one or more embodiments.

As illustrated in FIG. 1, the example charge pump circuit 100 may include first to fifth switches S1 to S5, a first capacitor C1, and a second capacitor C2. The charge pump circuit 100 may further include a first load capacitor Cload1 and a second load capacitor Cload2.

The charge pump circuit 100 may include one input terminal IN and two output terminals OUT1 and OUT2. The charge pump circuit 100 may receive a power voltage Vin through the input terminal IN, and may generate two output voltages Vout1 and Vout2 by using the power voltage Vin. The first output terminal OUT1 may output the first output voltage Vout1, and the second output terminal OUT2 may output the second output voltage Vout2. The power voltage Vin may be a positive (+) power voltage or may be a negative (−) power voltage. When the power voltage Vin is a positive (+) power voltage, the two output voltages Vout1 and Vout2 may be positive (+) voltages, and when the power voltage Vin is a negative (−) power voltage, the two output voltages Vout1 and Vout2 may be negative (−) voltages.

A first end of the first switch S1 may be connected to the input terminal IN, and a first end of the first capacitor C1 may be connected to a second end of the first switch S1. A first end of the second capacitor C2 may be connected to a second end of the first capacitor C1, and the second switch S2 may be connected between the input terminal IN and a second end of the second capacitor C2. That is, the first capacitor C1 and the second capacitor C2 may be coupled in series to each other between the first switch S1 and the second switch S2. The third switch S3 may be connected between the second end of the second capacitor C2 and a ground.

The fourth switch S4 may be connected between the first end of the first capacitor C1 and the first output terminal OUT1 and may output the first output voltage Vout1. The fifth switch S5 may be connected between a node between the first capacitor C1 and the second capacitor C2 and the second output terminal OUT2, and may output the second output voltage Vout2.

The first load capacitor Cload1 may be connected between the first output terminal OUT1 and the ground, and may stabilize the first output voltage Vout1. The second load capacitor Cload2 may be connected between the second output terminal OUT2 and the ground, and may stabilize the second output voltage Vout2.

In a non-limited example, the charge pump circuit 100 may have two operation sections. The first and second capacitors C1 and C2 may be charged for a first operation section, and the first and second output voltages Vout1 and Vout2 are output for a second operation section. This will be described in detail with reference to FIG. 2A and FIG. 2B.

Figure 2A:
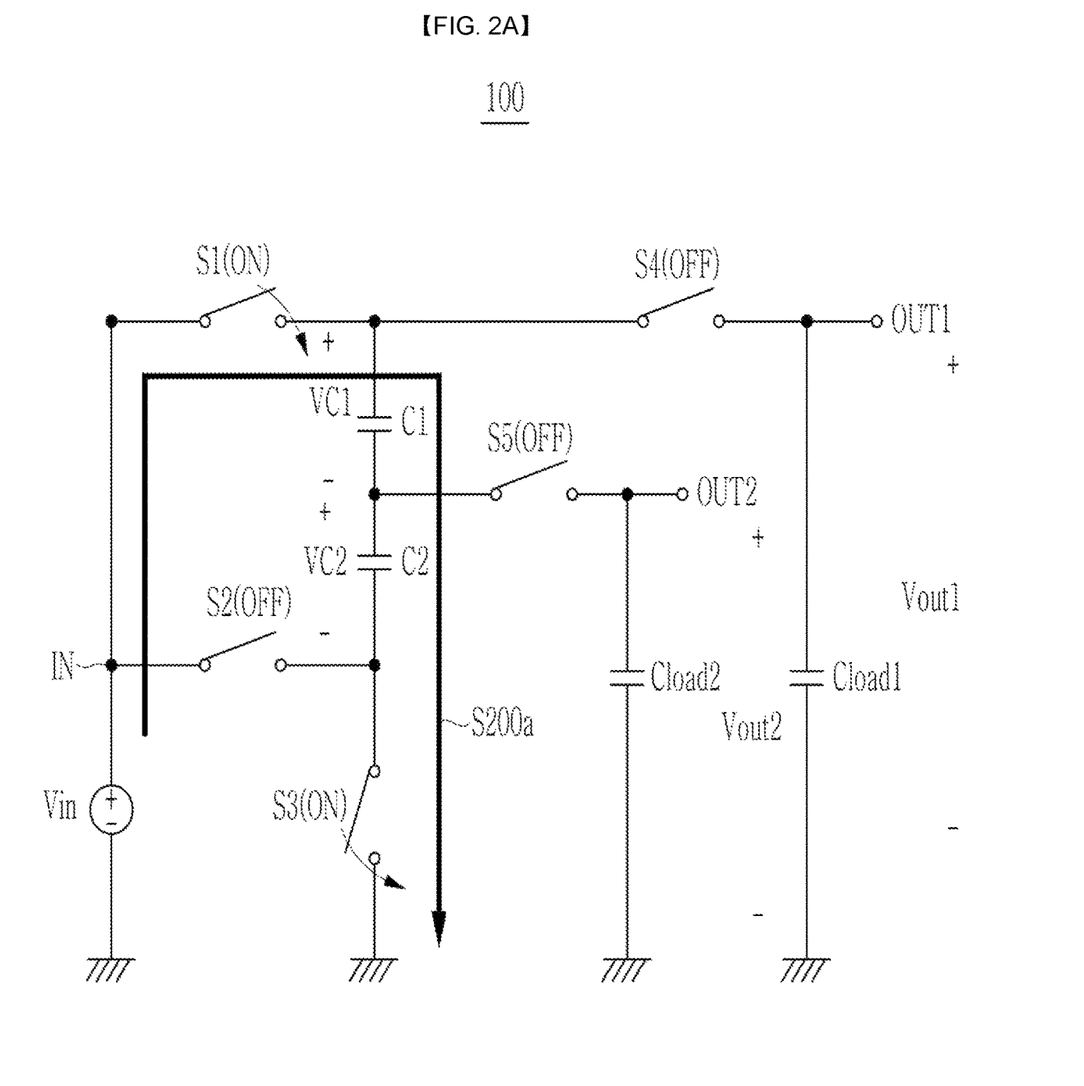
FIG. 2A illustrates an operation state of an example charge pump circuit 100 in a first operation section, in accordance with one or more embodiments.

FIG. 2A illustrates an operation state of an example charge pump circuit 100 in a first operation section, in accordance with one or more embodiments.

For the first operation section, the first switch S1 and the third switch S3 are turned on, and the second switch S2, the fourth switch S4, and the fifth switch S5 are turned off. As shown in FIG. 2A, a current path S200a is formed with the power voltage Vin, the first switch S1, the first capacitor C1, the second capacitor C2, the third switch S3, and the ground. By the current path (S200a), the power voltage Vin is divided and charged into the first and second capacitors C1 and C2. Referring to FIG. 2A, the voltage charged into the first capacitor C1 is marked as VC1, and the voltage charged into the second capacitor C2 is marked as VC2.

A relationship between the power voltage Vin and the voltage VC1 and VC2 that is charged into the first capacitor C1 and the second capacitor C2 may be expressed as indicated in Equation 1 below.

$$Vin = VC1 + VC2 \qquad \text{Equation 1:}$$

Figure 2B:
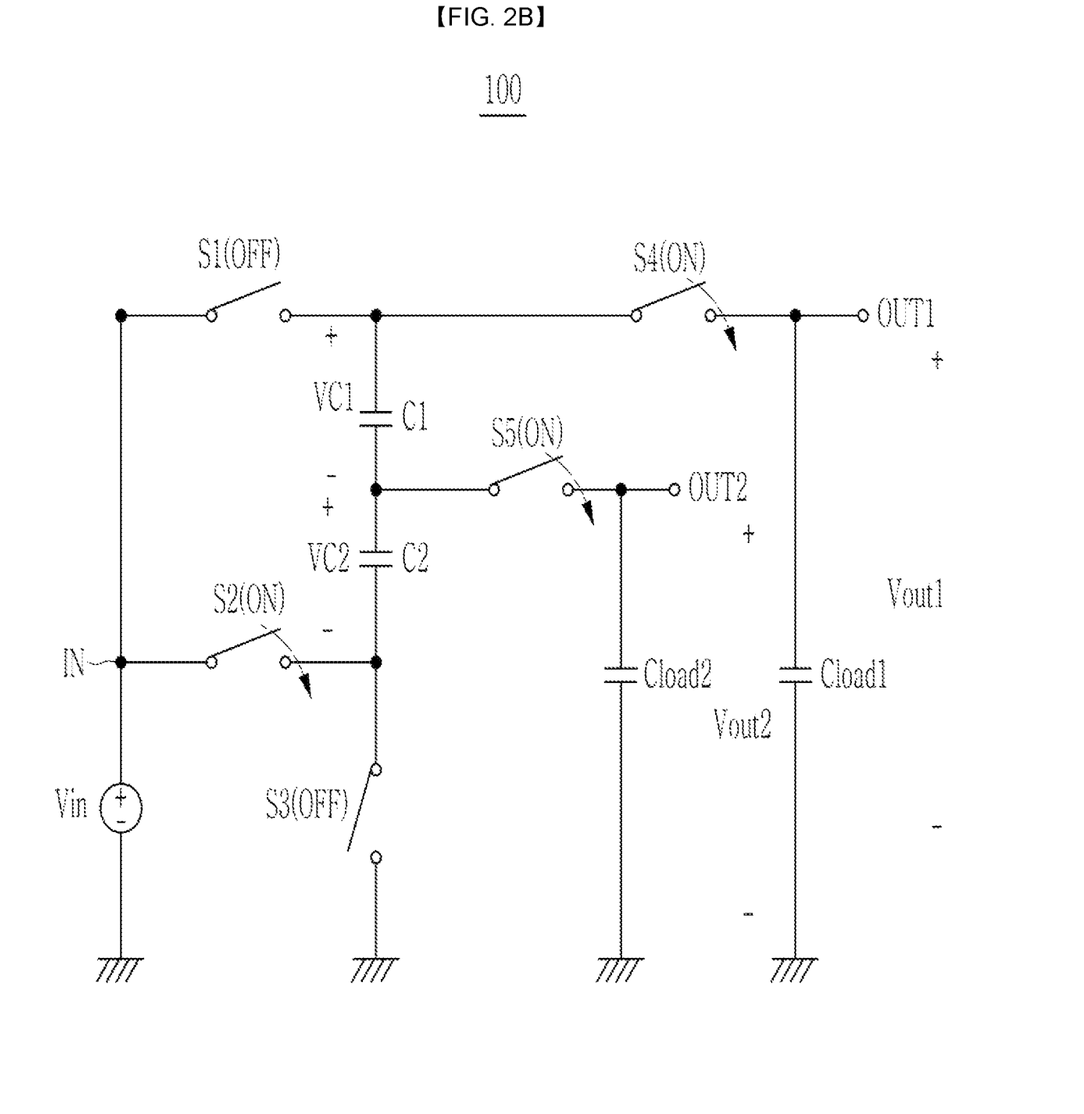
FIG. 2B illustrates an operation state of an example charge pump circuit 100 in a second operation section, in accordance with one or more embodiments.

FIG. 2B illustrates an operation state of a charge pump circuit 100 for the second operation section, in accordance with one or more embodiments.

For the second operation section, the second switch S2, the fourth switch S4, and the fifth switch S5 are turned on, and the first switch S1 and the third switch S3 are turned off. When the second switch S2 is turned on, the power voltage Vin is applied to the second end of the second capacitor C2. Accordingly, the respective first and second capacitors C1 and C2 may be boosted by an amount of the power voltage Vin. When the fourth switch S4 is turned on, the first output voltage Vout1 may be expressed as indicated in Equation 2 below.

$$Vout1 = Vin + VC1 + VC2 \qquad \text{Equation 2:}$$

When Equation 1 is applied to Equation 2, the first output voltage Vout1 may be expressed as indicated in Equation 3 below.

$$Vout1 = Vin + VC1 + VC2 = 2Vin \qquad \text{Equation 3:}$$

That is, a value of the first output voltage Vout1 may become twice a value of the input power voltage Vin based on the first and second operation sections.

Additionally, when the fifth switch S5 is turned on, the second output voltage Vout2 may be expressed as indicated in in Equation 4 below.

$$Vout2 = Vin + VC2 \qquad \text{Equation 4:}$$

Referring to Equation 4, the second output voltage Vout2 may be determined by the capacitance of the respective first and second capacitors C1 and C2 and the power voltage Vin. The second capacitor C2 may be a variable capacitor of which capacitance is changeable by an external setting, and accordingly, the second output voltage Vout2 may be adjusted.

As described, the charge pump circuit 100 may output the first and second output voltages Vout1 and Vout2 through the first and second operation sections. That is, the charge pump circuit 100 may generate two output voltages by using one power voltage Vin. For example, the first output voltage Vout1 may drive the RF switch, and the first output voltage Vout2 may be used as a power voltage of an IC.

Figure 3:
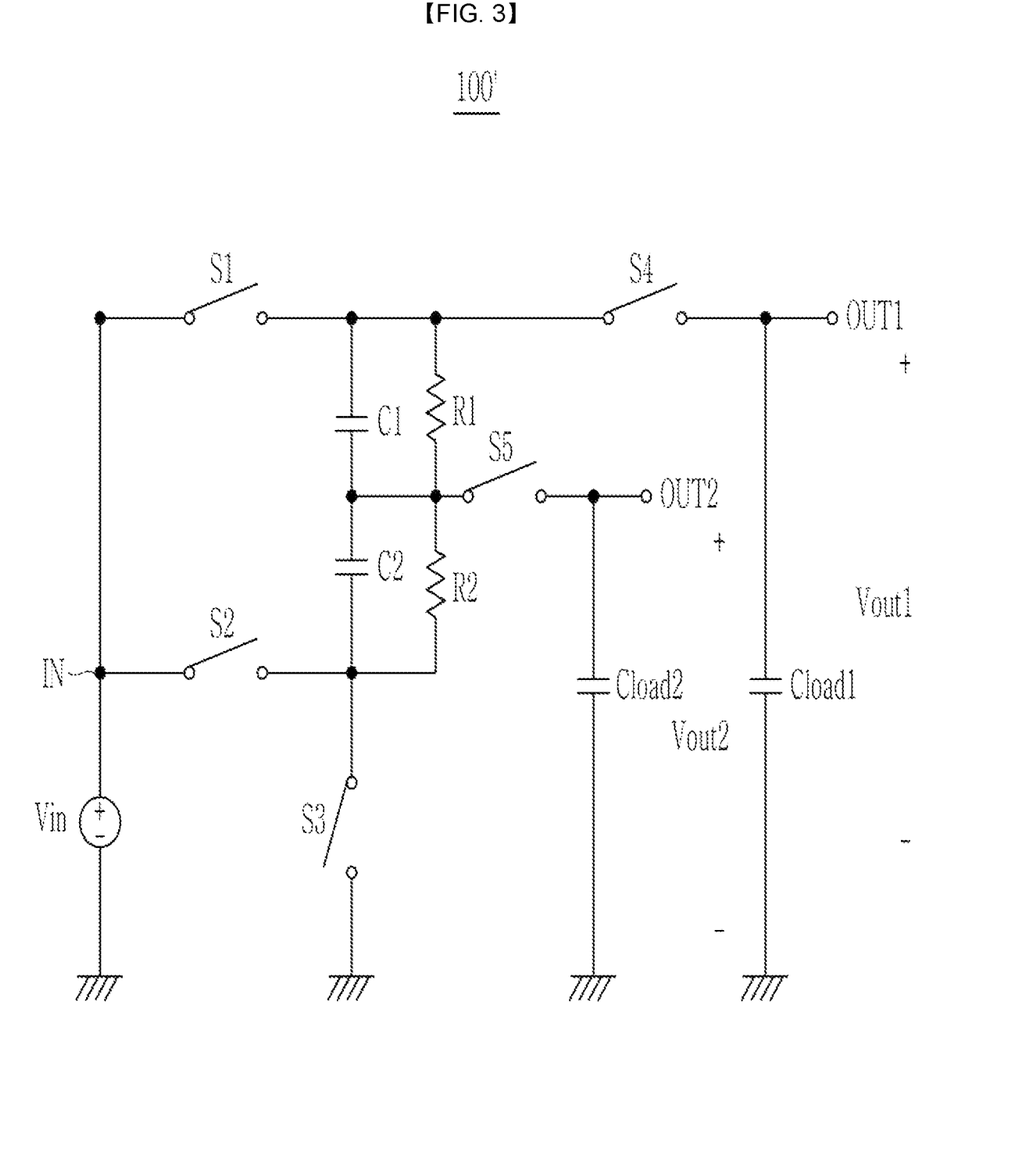
FIG. 3 illustrates an example charge pump circuit 100', in accordance with one or more embodiments.

FIG. 3 illustrates a charge pump circuit 100', in accordance with one or more embodiments.

The example charge pump circuit 100', in accordance with one or more embodiments, corresponds to the charge pump circuit 100 described with reference to FIG. 1 except that it further adds a first resistor R1 and a second resistor R2 to the charge pump circuit 100 of FIG. 1. No repeated descriptions will be provided.

As illustrated in FIG. 3, the first resistor R1 may be coupled in parallel with respective ends of the first capacitor C1, and the second resistor R2 may be coupled in parallel with respective ends of the second capacitor C2. The voltage VC1 charged at the respective ends of the first capacitor C1 may be stabilized by the first resistor R1. The voltage VC2 charged at the respective ends of the second capacitor C2 may be stabilized by the second resistor R2.

An operation of the charge pump circuit 100', in accordance with one or more embodiments, is very similar to the charge pump circuit 100 of FIG. 1, which will now be described with reference to FIG. 4A and FIG. 4B.

Figure 4A:
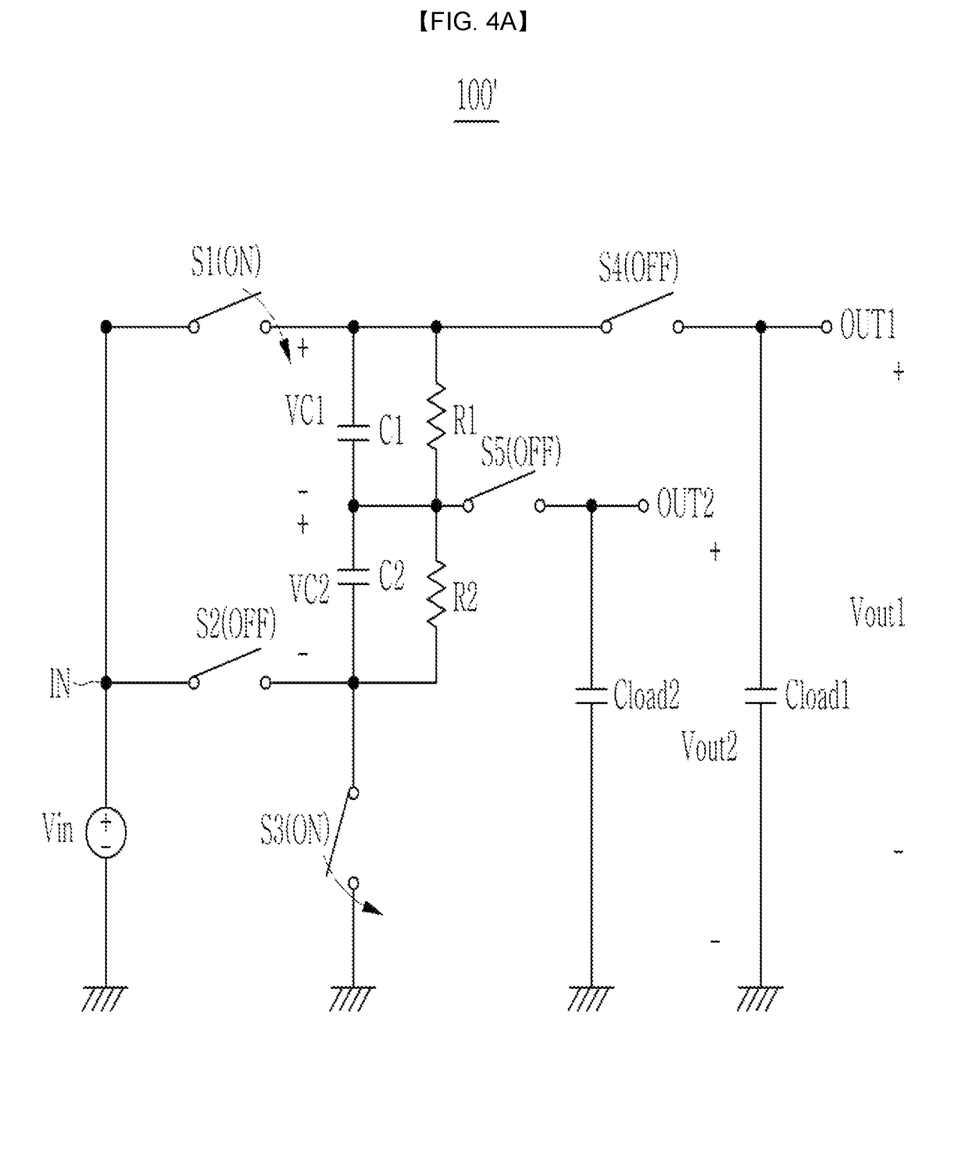
FIG. 4A illustrates an operation state of an example charge pump circuit 100' in a first operation section, in accordance with one or more embodiments.

FIG. 4A illustrates an operation state of a charge pump circuit 100' in a first operation section, in accordance with one or more embodiments.

For the first operation section, the first switch S1 and the third switch S3 are turned on, and the second switch S2, the fourth switch S4, and the fifth switch S5 are turned off. The power voltage Vin is divided by the first resistor R1 and the second resistor R2, and the divided voltages are charged in the first and second capacitors C1 and C2.

The voltage VC1 charged in the first capacitor C1 may be expressed as indicated in Equation 5 below.

$$VC1 = \frac{R1}{R1 + R2} \times Vin \qquad \text{Equation 5}$$

The voltage VC2 charged in the second capacitor C2 may be expressed as indicated in Equation 6 below.

$$VC2 = \frac{R2}{R1 + R2} \times Vin \qquad \text{Equation 6}$$

Figure 4B:
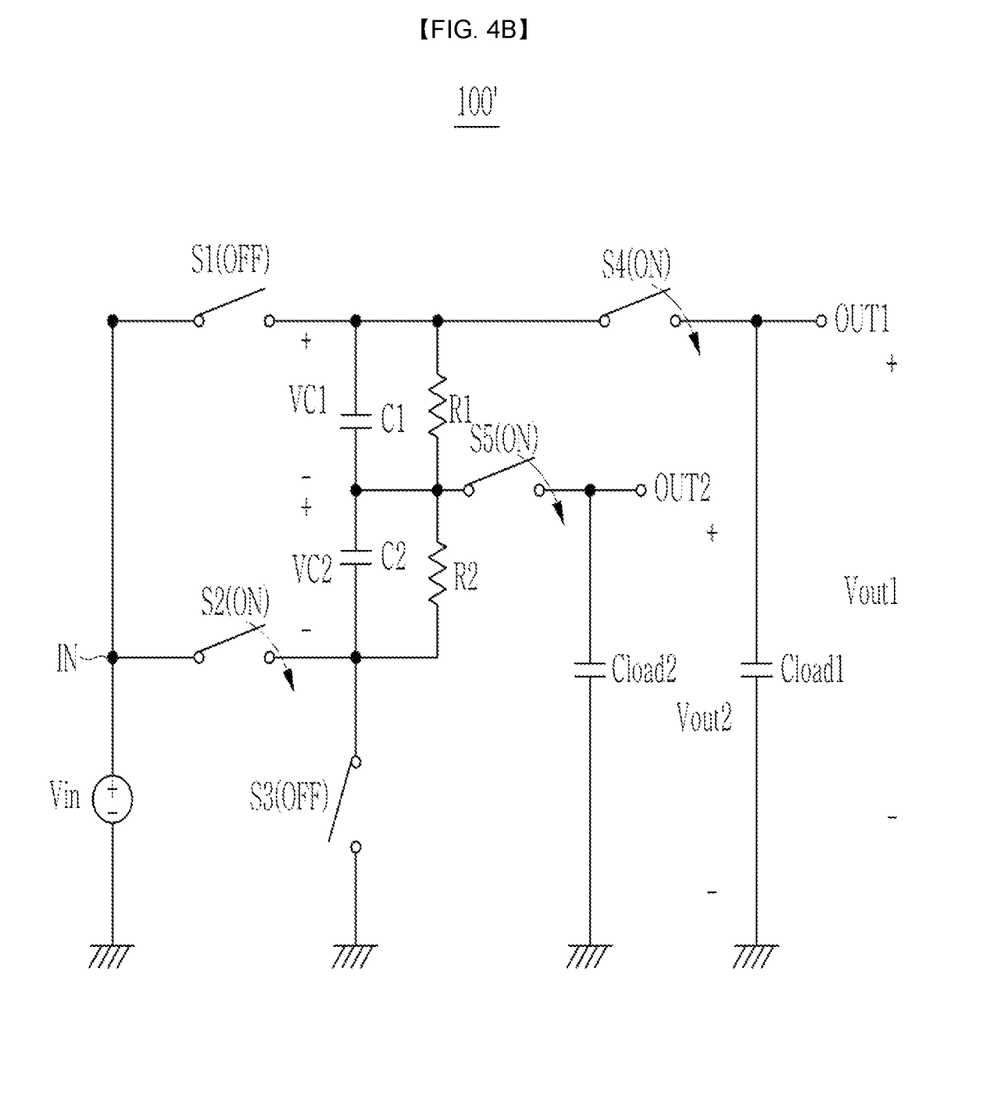
FIG. 4B illustrates an operation state of an example charge pump circuit 100' in a second operation section, in accordance with one or more embodiments.

FIG. 4B illustrates an operation state of a charge pump circuit 100' in a second operation section, in accordance with one or more embodiments.

For the second operation section, the second switch S2, the fourth switch S4, and the fifth switch S5 are turned on, and the first switch S1 and the third switch S3 are turned off. When the second switch S2 is turned on, the power voltage Vin is applied to the second end of the second capacitor C2. Accordingly, the first and second capacitors C1 and C2 may be boosted by the amount of the power voltage Vin. As the fourth switch S4 is turned on, the first output voltage Vout1 may be expressed as indicated in Equation 7 below.

$$Vout1 = Vin + VC1 + VC2 \qquad \text{Equation 7:}$$

When Equations 5 and 6 are applied to Equation 7, the first output voltage Vout1 may be expressed as indicated in Equation 8 below.

$$Vout1 = Vin + \frac{R1}{R1+R2} \times Vin + \frac{R2}{R1+R2} \times Vin = 2\ Vin \qquad \text{Equation 8}$$

In a non-limited example, in the charge pump circuit 100', the first output voltage Vout1 may be twice the input power voltage Vin.

Additionally, when the fifth switch S5 is turned on, the second output voltage Vout2 may be expressed as indicated in Equation 9 below.

$$Vout2 = Vin + VC2 \qquad \text{Equation 9:}$$

When Equation 6 is applied to Equation 9, the second output voltage Vout2 may be expressed as indicated in Equation 10 below.

$$Vout2 = Vin + \frac{R2}{R1+R2} \times Vin = Vin \times \left(1 - \frac{R2}{R1+R2}\right) \qquad \text{Equation 10}$$

Referring to Equation 10, the second output voltage Vout2 may be determined by resistance of the respective first and second resistors R1 and R2 and the power voltage Vin. In a non-limiting example, the second resistor R2 may be a variable resistor of which resistance is changeable by an external setting, and accordingly, the second output voltage Vout2 may be adjusted. It may be easier to adjust resistance than to adjust capacitance, so the charge pump circuit 100' may generate further stable output voltages Vout1 and Vout2.

Figure 5:
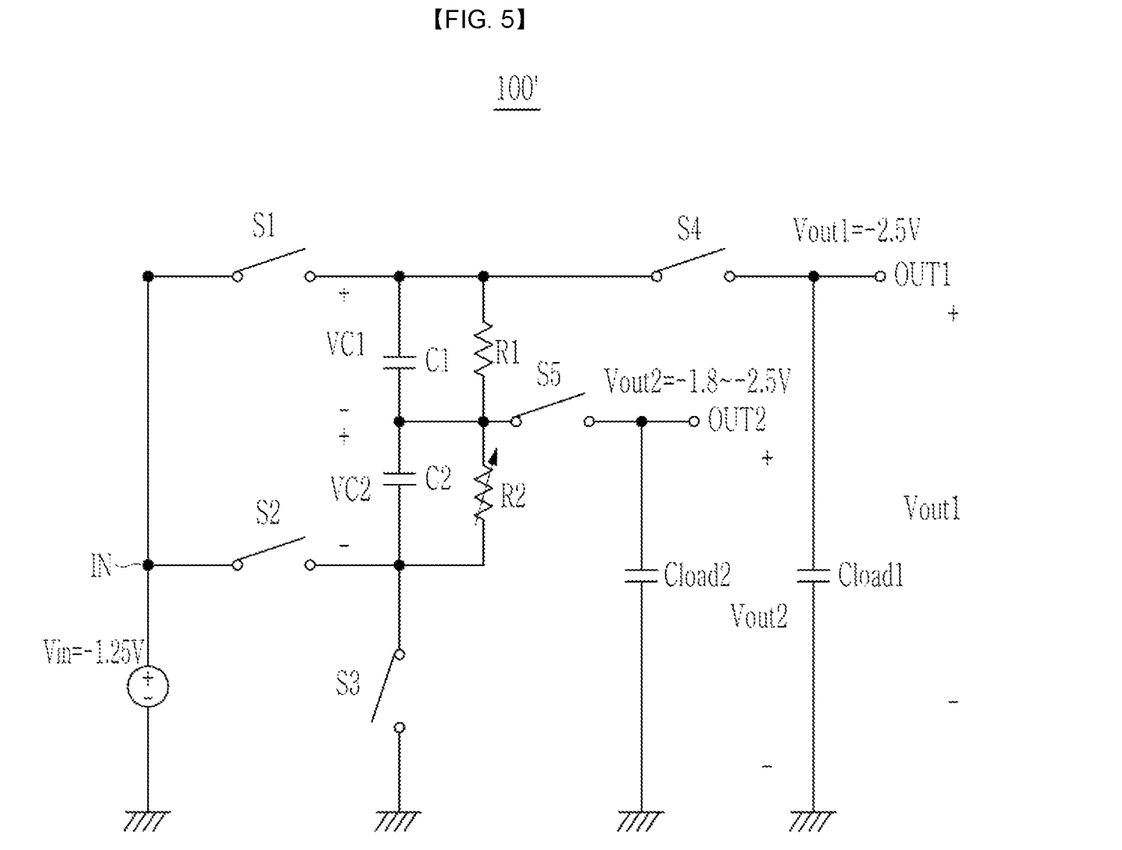
FIG. 5 illustrates an application example for the charge pump circuit 100' of FIG. 3, in accordance with one or more embodiments.

FIG. 5 illustrates an application example for the charge pump circuit 100' of FIG. 3.

Regarding the charge pump circuit 100', the power voltage Vin may be −1.25 V, and the second resistor R2 may be a variable resistor. Referring to Equation 8, the first output voltage Vout1 may have a value of −2.5 V that is twice a value of the power voltage Vin. Referring to Equation 10, the second output voltage Vout2 may be set to have a value between −1.8 V and −2.5 V. The second output voltage Vout2 may be set by varying a resistance of the second resistor R2. The two negative output voltages may be used to turn off the RF switch. When the RF switch is realized with an FET, a negative voltage may be applied to a gate terminal of the FET and a body terminal so as to turn off the RF switch. When t different negative voltages instead of the same negative voltage are applied to the gate terminal and the body terminal in the example of turning off the RF switch, a leakage current generated by a gate induced drain leakage (GIDL) may be reduced. That is, the first output voltage Vout1 of −2.5 V may be applied to the body terminal, and the second output voltage Vout2 of −1.8 V to −2.5 V may be applied to the gate terminal. Accordingly, the leakage current may be reduced by setting the voltage applied to the gate terminal to be greater than the voltage applied to the body terminal.

The above-described embodiments may generate the two output voltages with the input power voltage without implementing the typical voltage regulator in the charge pump circuit.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A charge pump circuit, comprising:
    a first switch configured to have a first end connected to an input terminal configured to receive a power voltage input;
    a second switch configured to have a first end connected to the input terminal;
    a first capacitor configured to have a first end connected to a second end of the first switch;
    a second capacitor connected between a second end of the first capacitor and a second end of the second switch;

a third switch connected between the second end of the second switch and a ground;

a fourth switch connected between the first end of the first capacitor and a first output terminal, wherein the first output terminal is configured to output a first output voltage; and a fifth switch connected between a second output terminal and a node between the first capacitor and the second capacitor, wherein the second output terminal is configured to output a second output voltage.

2. The charge pump circuit of claim 1, further comprising:
a first resistor coupled in parallel with respective ends of the first capacitor; and
a second resistor coupled in parallel with respective ends of the second capacitor.

3. The charge pump circuit of claim 2, wherein the second resistor is a variable resistor.

4. The charge pump circuit of claim 1, wherein:
for a first operation period, the first switch and the third switch are turned on, and the second switch, the fourth switch, and the fifth switch are turned off, and
for a second operation period, the second switch, the fourth switch, and the fifth switch are turned on, and the first switch and the third switch are turned off.

5. The charge pump circuit of claim 1, wherein:
a value of the first output voltage is twice a value of the power voltage, and
a value of the second output voltage is less than the value of the first output voltage.

6. The charge pump circuit of claim 1, further comprising:
a first load capacitor connected between the first output terminal and the ground; and
a second load capacitor connected between the second output terminal and the ground.

7. The charge pump circuit of claim 1, wherein the first output voltage is applied to a body terminal of a radio frequency (RF) switch, and the second output voltage is applied to a gate terminal of the RF switch.

8. A method, comprising:
coupling a first capacitor and a second capacitor in series with each other;
charging the first capacitor and the second capacitor by turning on a first switch connected between a power voltage and a first end of the first capacitor, and turning on a third switch connected between a first end of the second capacitor and a ground;
boosting the first capacitor and the second capacitor by turning on a second switch connected between the power voltage and the first end of the second capacitor;
outputting a first output voltage by turning on a fourth switch connected between the first end of the first capacitor and a first output terminal; and
outputting a second output voltage by turning on a fifth switch connected between a second output terminal and a node between the first capacitor and the second capacitor.

9. The method of claim 8, wherein in the boosting, the first switch and the third switch are turned off.

10. The method of claim 8, wherein a first resistor is coupled in parallel with respective ends of the first capacitor, and a second resistor is coupled in parallel with respective ends of the second capacitor.

11. The method of claim 8, wherein:
a value of the first output voltage is twice a value of the power voltage, and
a value of the second output voltage is less than a value of the first output voltage.

12. The method of claim 8, wherein the first output voltage is applied to a body terminal of a radio frequency (RF) switch, and the second output voltage is applied to a gate terminal of the RF switch.

13. A circuit, comprising:
a first switch connected to an input power voltage;
a second switch connected to the input power voltage;
a first capacitor and a second capacitor connected in series between the first switch and the second switch;
a third switch connected to the second switch;
a fourth switch connected to a first output terminal configured to output a first output voltage; and
a fifth switch connected between a second output terminal configured to output a second output voltage and a terminal between the first capacitor and the second capacitor.

14. The circuit of claim 13, further comprising a first resistor connected in parallel with the first capacitor, and a second resistor connected in parallel with the second capacitor.

15. The circuit of claim 13, further comprising a first load capacitor connected between the fourth switch and the first output terminal, and a second load capacitor connected between the fifth switch and the second output terminal.

* * * * *